United States Patent [19]

Streit

[11] 4,002,358
[45] Jan. 11, 1977

[54] ADAPTER FOR CONNECTING CONDUIT TO PIPE

[75] Inventor: Kenneth F. Streit, Mt. Prospect, Ill.

[73] Assignee: Phone-Ducs, Inc., Ill.

[22] Filed: Jan. 27, 1975

[21] Appl. No.: 544,496

[52] U.S. Cl. .......................... 285/137 R; 285/176; 285/175; 285/330; 285/423; 285/DIG. 16
[51] Int. Cl.² ....................................... F16L 39/00
[58] Field of Search .............. 285/178, 175, 137 R, 285/176, 369, DIG. 16, 27, 330, 423; 138/115, 116, 117, 155

[56] References Cited
UNITED STATES PATENTS

| | | | |
|---|---|---|---|
| 259,045 | 6/1882 | Richardson | 138/115 X |
| 3,353,563 | 11/1967 | Hutton | 285/374 X |
| 3,421,781 | 1/1969 | Spurk | 285/176 |
| 3,792,878 | 2/1974 | Freeman | 285/423 |
| 3,811,711 | 5/1974 | Tarkenton | 285/137 R |
| 3,895,830 | 7/1975 | Madlem | 285/27 |

*Primary Examiner*—Dave W. Arola

[57] ABSTRACT

An adapter is disclosed for connecting a multi-passage conduit section to a plurality of single bore pipes. Both the conduit and the adapter have partition walls forming passageways, and the adapter has a male end receivable in the female end of the conduit. The partition walls at the male end of the adapter are generally rectangular and correspond in configuration to the partition walls at the female end of the conduit, whereas the partition walls at the opposite end of the adapter along with the enclosing walls of the adapter define a plurality of cylindrical sleeves into which pipe sections are receivable. The partition walls taper generally uniformly from a generally rectangular to a cylindrical configuration. The pipe sections can be coupled to single bore pipes.

The partition walls at the female end of the conduit section include an inclined projection, and the partition walls at the male end of the adapter have a correspondingly inclined recess to allow interlocking telescopic mating of the adapter and conduit section. The inclined projections and recesses provide mutual surface to surface reinforcement to support the joint between the adapter and conduit section against shear loading.

13 Claims, 8 Drawing Figures

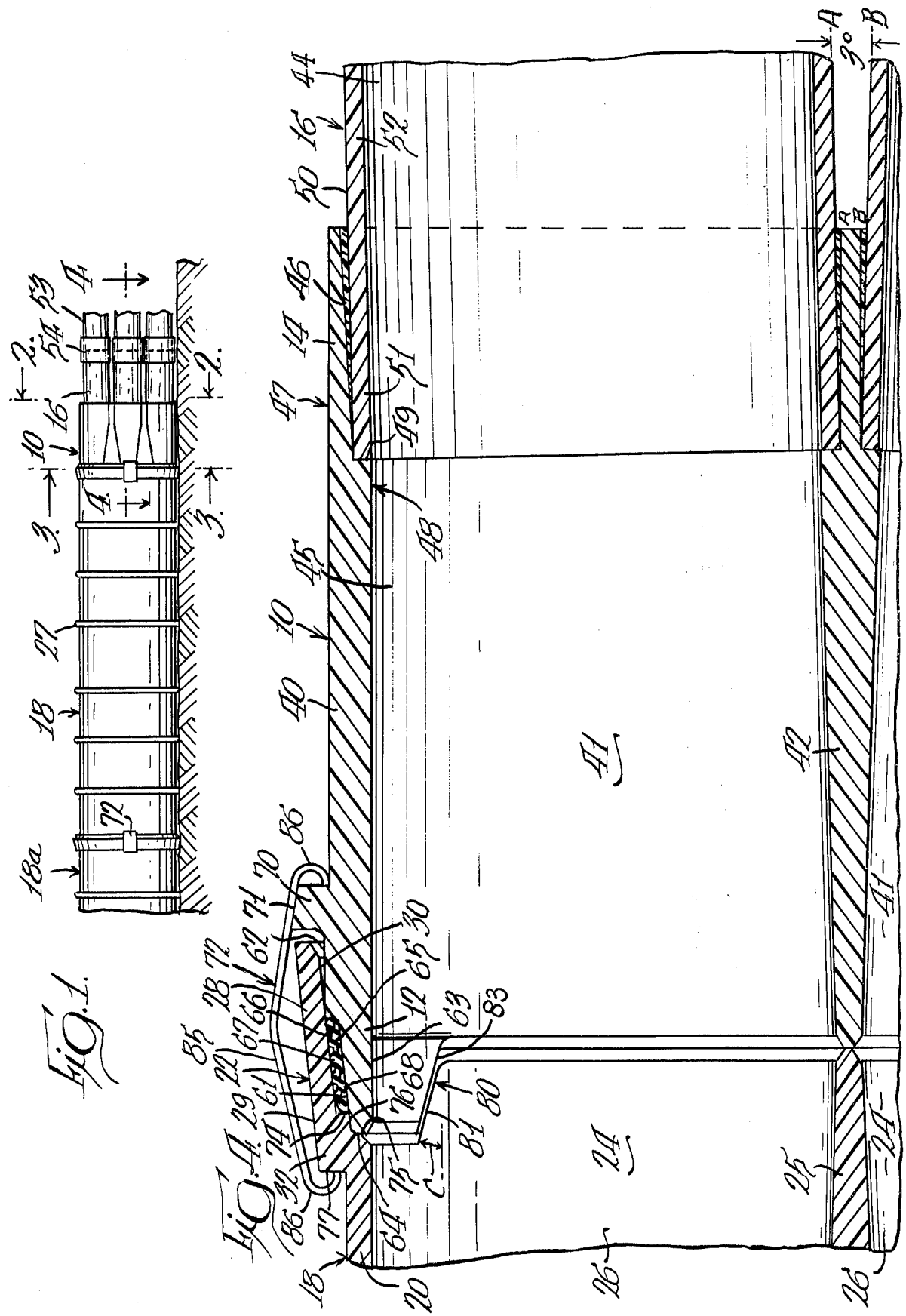

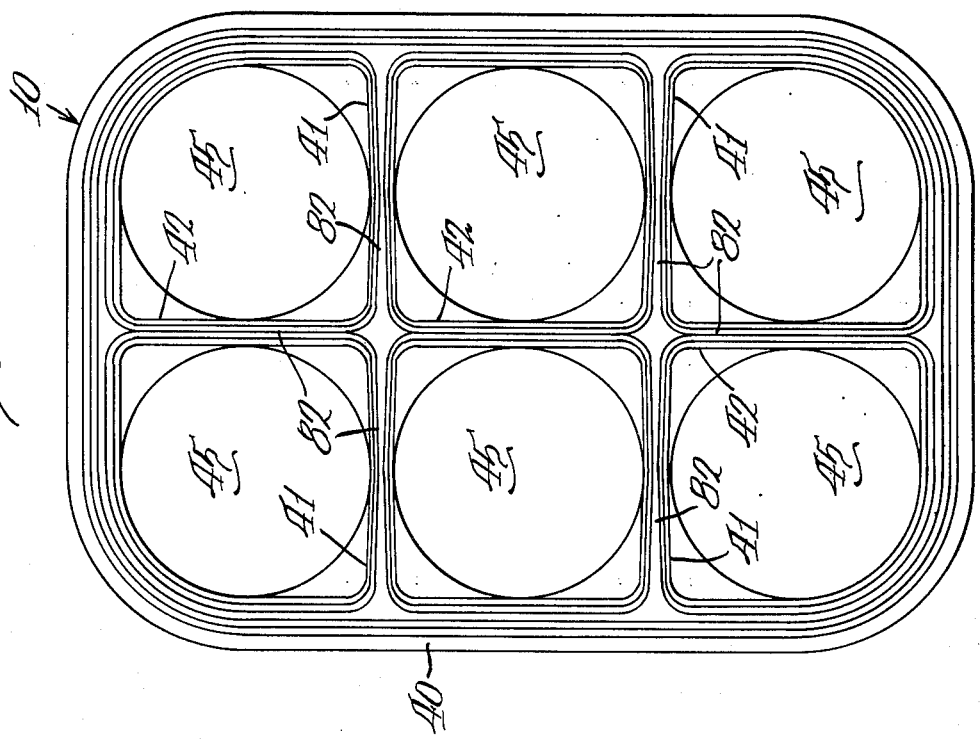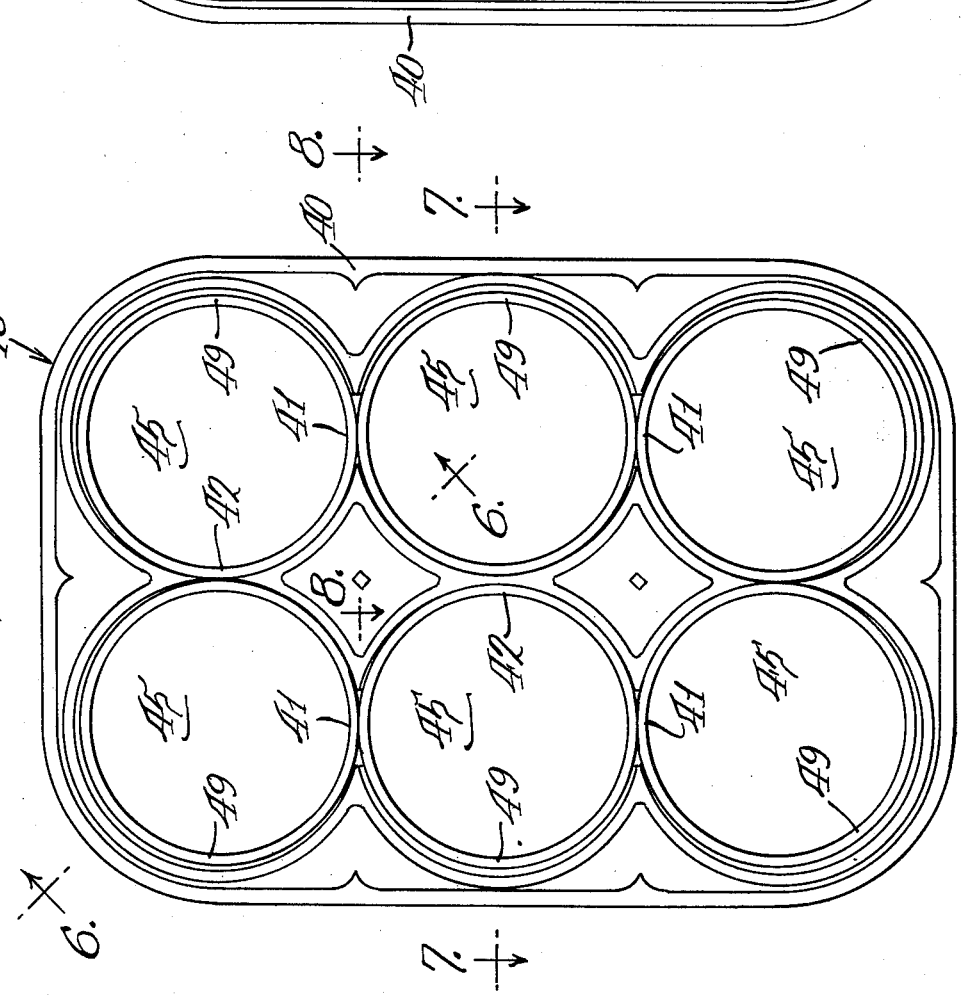

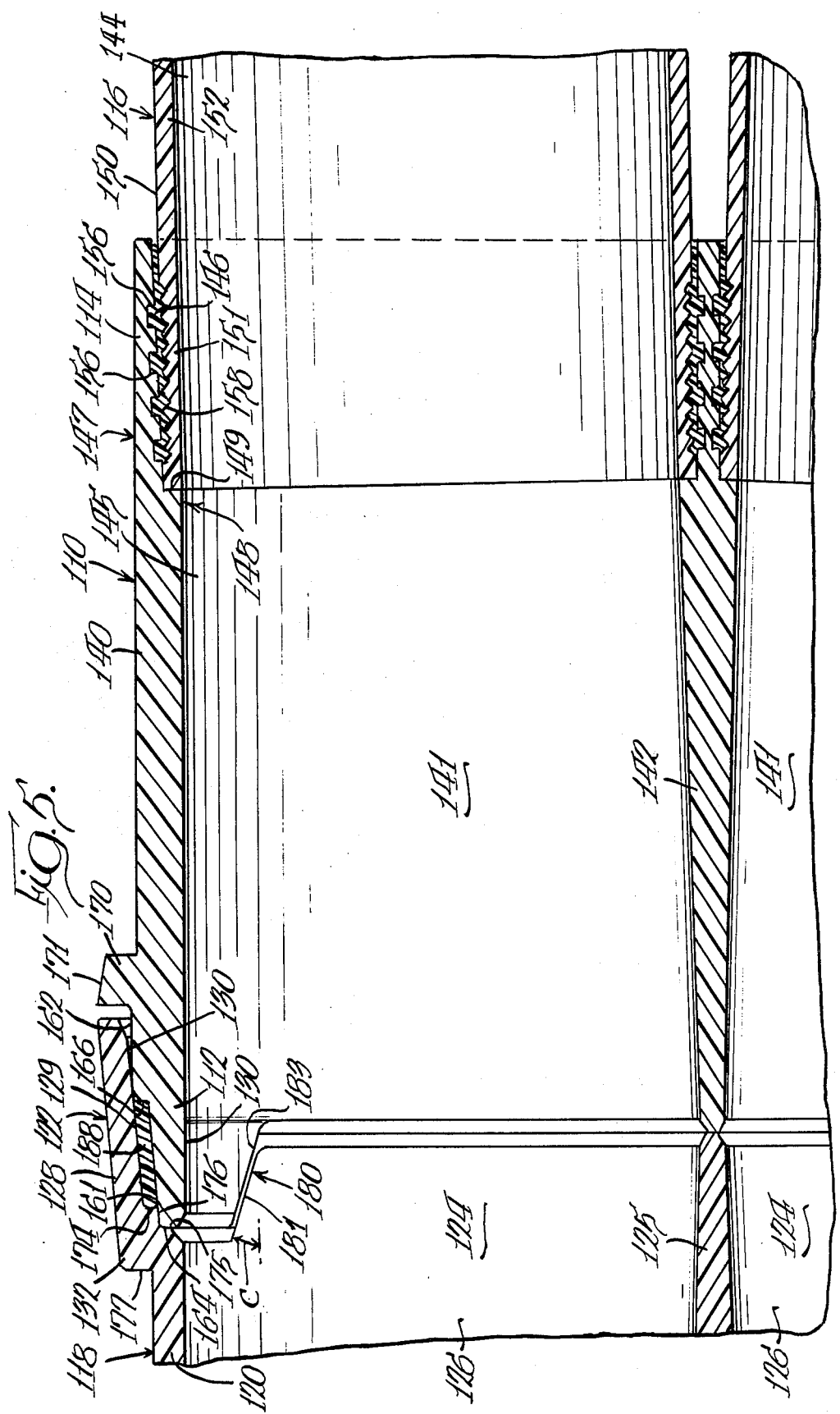

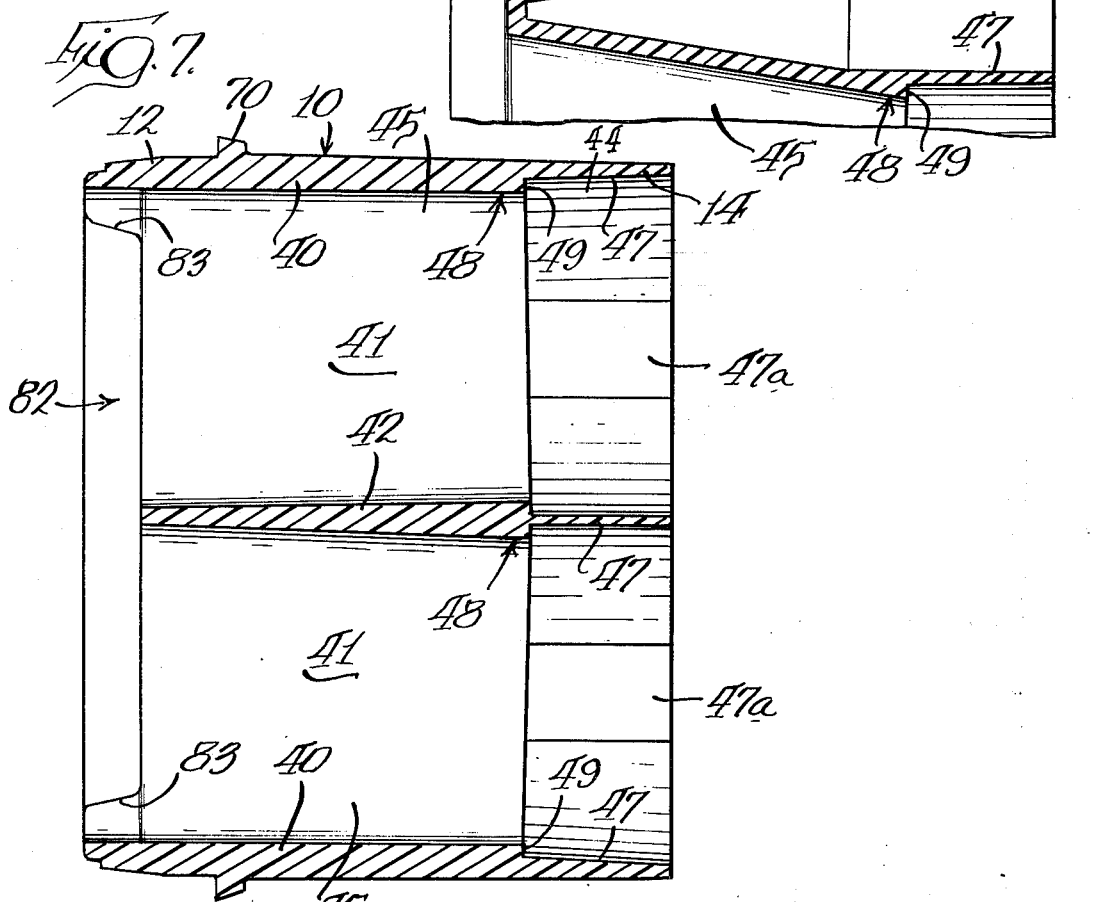

ADAPTER FOR CONNECTING CONDUIT TO PIPE

BACKGROUND OF THE INVENTION

This invention relates to conduit sections and more particularly to an adapter for providing a transition between a conduit section to at least one single bore pipe.

With the increasing use of transmission lines, such as telephone and telegraph cables, computer data lines and cable television, as well as public protestations against above ground transmission towers, underground burial of cables has become the expedient used to provide a path for such cables. The use of buried conduit sections to provide cable passages not only overcomes public dissatisfaction with above ground installations, but also provides an economical way of expanding capacity without a great increase in capital costs required by erecting new transmission towers or gaining access to new rights of way. By initially installing conduit sections having capacity above the present requirements, the excess conduit passages may be used for later growth by merely drawing new cables therethrough.

Several cable conduits have been proposed in the past, such as those disclosed in commonly assigned U.S. Pat. Nos. 3,545,493, 3,792,878 and copending, commonly assigned U.S. Patent application Ser. No. 403,248 filed Oct. 3, 1973.

In the past, there have been problems in providing a smooth transition between the generally rectangular passageways in cable conduits to a cylindrical pipe. It is frequently desirable to provide a sealed connection between a plurality of single bore pipes to a multi-passage conduit section. In prior art adapters, the joint between the adapter and the conduit section would fail when subjected to substantial shear stress, as when ground settles resulting in void areas beneath the conduit. Whereas partition walls in the adapter and the adjacent conduit section function to reinforce the sidewall of the conduit, they provide little if any support for the joint.

With increasing depths of burial and increasing conduit widths, greater pressure is presented on the conduit and adapter particularly at the joints therebetween. In prior art types of adapters, one end of the adapter is a spigot which is receivable in the bell end of an adjacent conduit section, and the shear stress at the joint with the conduit is supported mainly by the bell of conduit. As the width of the adapter and conduit are increased, the pressure thereon is increased as by ground loads of heavy vehicles above the adapter and conduit, and the bell is often over stressed and failures have occurred which may result in damage to the integrity of the adapter and conduit and damage to the cables positioned therein.

SUMMARY OF THE INVENTION

An adapter according to the present invention has one end which connects to one end of a conduit section to provide a transition from the conduit section to a plurality of single bore pipes.

Both the conduit section and the adapter have enclosing walls defining a passage therein, and partition walls extending transversely between the enclosing walls divide the passages into a plurality of longitudinally extending passageways. The partition walls at the one end of the adapter define generally rectangular passageways and have a configuration generally corresponding to the partition walls at the adjacent one end of the conduit, and the partition walls and enclosing walls at the opposite end of the adapter define a plurality of cylindrical sleeves into which pipe sections are receivable. The partition walls in the adapter taper generally uniformly from a generally rectangular configuration to a cylindrical configuration. The pipe sections can be coupled to single bore pipes.

The partition walls at the adjacent ends of the adapter and conduit section are correspondingly recessed so that interlocking mating of the adapter and conduit section may take place to provide column-like support of the joint rather than planar vertical interfacing of the partition walls at the joint, as in prior art adapters and conduit sections.

In the preferred embodiment, the adapter or conduit section has a female end which is flared outwardly to provide a bell, and portions of the partition walls of the part having the female end project into the female portion at the end of each partition wall to provide an inclined projection having a shape complementary to a U-shape. The other part has a male end which is provided with correspondingly recessed partition wall portions which are surrounded by a tapered wall or spigot for insertion into the female portion of the first part. More specifically, the adapter is provided with a male end which is receivable in the female end of an adjacent conduit section.

The conduit sections and adapters of this invention are molded from polyolefinic materials, such as a high impact plastic like linear polyethylene, which provides a light-weight integral construction, as well as ease of manufacture.

An annular sealing gasket is provided on the male end of the adapter and includes continuous peripheral ribs to form a labyrinth seal at the joint. Connected sections are secured by spring clips or by welding.

BRIEF DESCRIPTION OF THE DRAWINGS

FIG. 1 is an elevation view illustrating the adapter of the present invention connecting a plurality of single bore pipes to a conduit;

FIG. 2 is an enlarged end view taken along plane 2—2 in FIG. 1 and illustrating one end of the adapter;

FIG. 3 is an enlarged end view taken along plane 3—3 in FIG. 1 and illustrating the male end of the adapter;

FIG. 4 is a cross-sectional view, on an enlarged scale, taken along plane 4—4 in FIG. 1;

FIG. 5 is a cross-sectional view similar to FIG. 4 and illustrating an alternate embodiment of the invention;

FIG. 6 is a cross-sectional view, on an enlarged scale, taken along plane 6—6 in FIG. 2;

FIG. 7 is a cross-sectional view, on an enlarged scale, taken along plane 7—7 in FIG. 2; and FIG. 8 is a cross-sectional view, on an enlarged scale, taken along plane 8—8 in FIG. 2.

DETAILED DESCRIPTION OF THE PREFERRED EMBODIMENTS

While this invention is susceptible of embodiment in many different forms, there is shown in the drawings and will herein be described in detail a preferred embodiment in accordance with the present invention, and with the understanding that the present disclosure is to be considered as an exemplification of the principles of the invention and is not intended to limit the invention to the specific embodiments illustrated and described.

Referring to FIG. 1, adapter 10 has male end 12 and opposite end 14 and connects a pluraity of pipe sections 16 to conduit section 18. A plurality of conduit sections 18, 18a are positioned in a trench which is excavated in the earth's surface to a depth desirable for burial of cables such as telephone or telegraph cables. Each conduit section is substantially the same in configuration as the other conduit sections and may be similar to those disclosed in the above-mentioned patents and application. Conduit section 18 has elongated enclosing walls 20 defining a passage therein, a bell shaped female end portion 22 at one end of the conduit section, and partition walls 24, 25 extending transversely between enclosing walls 20 within the passage for dividing the passage into a plurality of longitudinally extending passageways 26.

Enclosing walls 20 define an elongated generally rectangular shaped conduit section which is provided with longitudinally spaced apart, transversely arranged reinforcing ribs 27 which extend around the enclosing walls. These ribs 27 reinforce the enclosing walls to prevent collapsing or deformation thereof due to pressures and loads to which the walls may be subjected when the trench in which the conduit is positioned is backfilled and when any additional pressures are generated by ground loadings above the conduit.

The partition walls 24 extend perpendicularly from the top to the bottom of the enclosing walls 20 and partition wall 25 is formed at right angles to partition wall 25 and extends between the sides of the enclosing walls for dividing the interior of the conduit section transversely into a plurality of longitudinally extending passageways 26, FIG. 4, which are generally rectangularly shaped in cross section.

The female end of each conduit section 18 is formed by enlarged outwardly flared portion 28 which is integrally formed with the enclosing walls at one end thereof. As best illustrated in FIG. 4, female end 28 is defined by two parallel outwardly flared surfaces 29 and 30 which are joined to the enclosing walls 20 by a generally L-shaped angle portion 32.

As shown in FIGS. 2–4, adapter 10 is integral and has enclosing walls 40 defining a passage therein. Walls 40 are integral with one another, peripherally continuous, and substantially equal in outer dimension to the outer dimension of the adjacent conduit section. At the male end 12 of the adapter, enclosing walls 40 define a generally rectangular shaped adapter segment which generally corresponds in configuration to enclosing walls 20 of the conduit section. At the opposite end 14 of the adapter, enclosing walls 40 are curved and define a portion of the outside wall of a plurality of cylindrical sleeves. As illustrated in FIGS. 6–8, the partition walls taper generally uniformly from male end 12 to shoulder 49, and the inner diameter of the partition walls remains constant along segment 47 (as discussed below) to define a plurality of cylindrical sleeves in which pipes 16 are receivable. For convenience of manufacture, the partition walls have a discontinuity 47a therein whereby the partition walls are generally C-shaped along segment 47.

Adapter 10 also has partion walls 41 which extend perpendicularly from the sides of enclosing walls 40 along male end 12, and a partition wall 42 which is formed at right angles to partition walls 41 along male end 12 and extends between the sides of enclosing walls 40 for dividing the interior of the adapter into a plurality of longitudinally extending passageways 45 generally rectangular at male end 12.

The inside surface 43 of enclosing walls 40 and the inside walls of partition walls 41 and 42 define passageways 45 which comprise a plurality of cylindrical sleeves 44 along the opposite end 14 of adapter 10. A plurality of pipe sections 16 are receivable in the cylindrical sleeves 44 and can be bonded thereto by adhesive layer 46, whereby the pipe sections are secured to adapter 10 which is receivable in conduit section 18.

The internal transverse dimension between enclosing walls 40 and partition walls 41 and 42 has a first diameter along a first segment 47 of the adapter along opposite end 14, and a second diameter along a second segment 48 adjacent to said first segment and disposed between the first segment and the male end of the adapter. The first diameter is greater than the second diameter, and a shoulder 49 at the junction between the first and second segments serves as a stop means to prevent pipe sections 16 from being inserted into adapter 10 beyond first segment 47. Preferably, shoulder 49 has a length equal to the thickness of the walls of pipe sections 16 so that the inside wall of the pipe is flush with the inside surface of enclosing walls 40 and partition walls 41 and 42.

Pipe sections 16 have an outside surface 50, a first end segment 51 at one end of each pipe section which is receivable in adapter 10, and a second end segment 52 at the opposite end of each pipe section. Adhesive 46 is coated on the outside surface 50 along first end segment 51 and pipe sections 16 are inserted into adapter 10 until they abut shoulder 49. Pipe sections 16 are thereby bonded to the adapter along first segment 47 of the adapter.

A strong bond is required between first end segment 51 of each pipe section and first segment 47 of the adapter. Since special adhesives are preferably used to bond the pipe sections 16 to the polyolyfinic adapter, and it may be necessary to heat the adhesive to force dry the adhesive, it is inconvenient to connect pipes directly to adapter 10 in the field. Consequently, the present invention contemplates that pipe sections 16 are initially adhered to adapter 10, and single bore pipes 53 can be connected to pipe sections 16 by using coupling sleeves 54. Preferably, pipe sections 16 are of the same material as single bore pipes 53.

As illustrated in FIG. 1, single bore pipes 53 can be connected to adapter 10. Couplings 54 have one end positioned about corresponding pipe sections 16 with the inside surface of the couplings being bonded to the outside surface of the pipe sections. The opposite ends of couplings 54 have corresponding single bore pipes 53 inserted therein with the outside surface of the pipes being juxtaposed and bonded to the inside surface of the couplings. Single bore pipes 53 are thus connected to pipe sections 16 which are bonded to adapter 10 which is receivable in conduit section 18.

Pipe sections 16 preferably have the same outside diameter as single bore pipes 53, and couplings 54 have the same inside diameter at both ends so that the pipes and pipe sections can be received therein. Alternatively, the ends of single bore pipes 53 which face adapter 10 can be bell shaped whereby the bell portion has a wider inside diameter than the remaining portion of the pipe and can be positioned about pipe sections 16 and bonded directly thereto.

To enable couplings 54 to be positioned about pipe sections 16 and single bore pipes 53, the uppermost and lowermost pipe sections 16 form an angle with respect to the horizontal (FIG. 1) and the pipe sections which are inserted in the cylindrical sleeves illustrated on the left in FIG. 2 are skewed outwardly with respect to the pipe sections which are inserted in the cylindrical sleeves illustrated on the right in FIG. 2. For example, the center line of each pipe section can form an angle of about 3° relative to the center lines of the adjacent pipe sections. Thus, in FIG. 4, line A—A formed by the outside surface of pipe section 16 forms an angle of 3° relative to the line B—B formed by the outside surface of the adjacent pipe section.

In the following portion of the description, three digit numerals 100 to 199 are used to refer to the embodiment illustrated in FIG. 5, and the same last two digits in each numeral in FIG. 5 designate like elements in the embodiment illustrated in FIGS. 1–4.

An alternate embodiment is illustrated in FIG. 5 wherein adapter 110 has a plurality of grooves 156 which extend continuously around the inside wall of first segment 147 along opposite end 114 of the adapter. Adhesive 146 enters grooves 156 when pipe sections 116 are inserted into the adapter and provides better pull resistance to retain each pipe section in the adapter. Similarly, pipe sections 116 can be provided with a plurality of serrations 158 extending continuously around the outside surface 150 along first end segment 151 to further increase the shear strength between the pipe sections 116 and adapter 110.

Male end 12 of adapter 10 is formed by extension of the enclosing walls 40 to provide an outer outwardly tapered surface 61 having a shoulder portion 62. The inner surface 63 of the male end may also be outwardly flared, if desired. The juncture of surfaces 61 and 63 at the free end of male end 12 is tapered to produce a generally triangular shaped end portion having an apex 64 extending outwardly from adapter 10.

An annular shaped, resilient, sealing gasket 65, which may be conveniently formed from neoprene rubber or the like, is positioned on tapered surface 61 of adapter 10. One end of gasket 65 abuts sidewall 66 of shoulder portion 62 which facilitates in accurately positioning the gasket during installation and provides effective sealing between conduit section 18 and adapter 10. The outer and inner surfaces of gasket 65 are provided with a plurality of spaced apart outwardly extending ribs 67 and 68, respectively, which extend continuously around the periphery of the gasket. As best illustrated in FIG. 4, when the male end of adapter 10 is inserted into the female end of an adjacent conduit section 18, ribs 67 are forced into engagement with the inner surface 30 of the female end and are deformed thereby, while ribs 68 are forced into engagement with surface 61 and deformed thereby to produce a labyrinth type seal at the joint.

A flange 70 which extends continuously around the periphery of the conduit is provided on the enclosing walls 40 of adapter 10 at a location spaced from the male end at a distance slightly greater than the depth of insertion of the male end.

Upper surface 71 of flange 70 is tapered at an angle corresponding to the taper of the legs of spring clips 72, discussed below, to facilitate positioning and support of the spring clips when they are installed.

The L-shaped angle portion 32 has an inner surface 74 which forms a generally reversed Z-shaped surface with the end of the enclosing walls to provide an outwardly facing shoulder 75 adapted to limit the insertion of the male end 12 of the adapter and a support surface 76 at the trunk of the Z-shaped surface having transverse dimensions corresponding to the transverse dimensions of the free end of tapered surface 61 so that surface 76 and angle portion 32 are supported thereon. Outer vertical surface 77 of angle portion 32 provides an attachment surface for one end of the spring clip 72.

To provide a column-like support at the joint between adjacent similar conduit sections, partition walls 24 project outwardly from the end of the enclosing walls 20 and into the female end of the conduit section to provide inclined projections 80 having a U complement shape. As illustrated in FIG. 4, projection 80 defines an inclined surface 81 at the top leg of the U complement shape which functions as a bearing surface. The angle of incline of each surface 81 from a longitudinal plane normal to the partition wall having the projection, as indicated by C on FIG. 4 should be in the range of about 10° to about 20°, preferably 15°. The partition walls 41 at the male end 12 of adapter 10 include a corresponding recess 82 to provide inclined bearing surfaces 83 which are brought into telescopic engagement with surfaces 81 when inserted into the adjacent conduit section 18. In one embodiment, it has been found that a clearance tolerance of 0.010 between surfaces 81 and 83 facilitates telescopic engagement of adjacent similar conduit sections. Partition wall 25 of conduit section 18 may also be similarly provided with inclined projections 80 at the female end, and partition wall 42 at the male end 12 of adapter 10 may be provided with recesses 82 (FIG. 3).

The inclined projections 80 and recesses 82 internest and mutually support one another and function as column-like supports for the joint of interconnected sections, and in combination with support of the female end of the conduit section at surface 76 by the free end of the male end of the adapter fully support the joint under shear stress loading. The loading absorbed thereby is in effect transferred to the entire conduit and adapter since the projections and recesses are cantilevers of the partition walls.

The internal transverse dimensions of the female end 22 of the conduit section 18 are greater than the external transverse dimensions of the male end 12 of the adapter 10 so as to accommodate the sealing gasket 65 therebetween.

The connected female end of the conduit section and male end of the adapter, as illustrated in FIG. 4, are held in assembled relationship by spring clips 72. Each spring clip includes an elongated bent portion 85 which spans the sealed joint between adjacent sections and which is reversely bent at each end, as indicated at 86. As indicated above, the taper of the elongated bent portions corresponds with the angled upper surface 71 of flange 70 so that the clip is supported thereon. Reversely bent portions 86 engage shoulder flange 70 and surface 77 of the adjacent sections to hold them in assembled relationship. The spring clips 72 are applied, as by hand pressure or by hammering them into place over the sealed joint between the sections with the reverse bends 86 engaging flange 70 and surface 77, respectively. The resiliency of spring clips 72 not only allows the application of the spring clips to the sealed joints by hammering or the like but also maintains the reverse bent portions 86 in contact with the sections.

As illustrated in FIG. 5, the female end 122 of the conduit section can be welded to the male end 12 of the adapter. Instead of inserting a gasket therebetween, the conduit and adapter can be welded together, such as by positioning an adhesive comprising extruded ribbon 188 of ferromagnetic particles in a thermoplastic material and induction heating the adhesive where both the adapter and conduit are formed from polyolefins.

Although the conduit sections as disclosed utilize partition walls with generally U-shaped inclined projections and recesses it will be readily appreciated that other projections and recess configurations may be utilized without departing from the spirit and scope of the invention, such as multi-stepped and saw-toothed projections and recesses which interlock and mate to provide column-like support for the joint. It would also be within the scope of this invention to provide an adapter with a female end adapted to receive the male end of a conduit section, and to provide projections on the male end receivable in recesses in the female end.

I claim:

1. A light-weight, integral plastic adapter for connecting a unitary multiple duct conduit section to a plurality of individual single bore cylindrically shaped pipes comprising: a generally rectangularly shaped sidewall defining a passage therein; means at one end of said sidewall for connecting said adapter to an end of a multiple duct conduit section; partition walls integral with and extending transversely between said sidewall for dividing said passageway into a plurality of individual passages which are generally rectangular shaped in cross-section at one end of said adapter, said partition walls extending from said one adapter end and terminating at a location spaced inwardly from a second opposite end of the adapter, said partition walls tapering generally uniformly to produce an increasing wall cross-sectional thickness from said one adapter end to said location so that each of said passages are generally circular in cross-section at said location and smaller in cross-sectional area at said location than at said one adapter end; and further wall means integral with said sidewall and said partition walls and extending from said second adapter end to said location, said further wall means providing a plurality of cylindrical sleeves each aligned with one of said passages, each of said sleeves being adapted to be connected to one of said individual single bore pipes to provide a smooth transition between the rectangularly shaped end of said passages and said pipes.

2. An adapter as defined in claim 1 wherein the inside diameter of said further wall means is greater than the inside diameter of said partition walls at said location, whereby said partition walls comprise a stop means to prevent each said pipe from being inserted into said adapter beyond said further wall means.

3. An adapter as defined in claim 2 wherein each said pipe has an outside surface, a first end segment at one end of each pipe which is receivable in said adapter, and an adhesive material is coated on said outside surface along said first end segment of each pipe whereby each said pipe is bonded to said adapter along said further wall means when inserted into the cylindrical sleeves.

4. An adapter as defined in claim 3 wherein said further wall means has a plurality of serrations along the inside surface to provide greater shear strength to retain each said pipe in said adapter when bonded thereto.

5. An adapter as defined in claim 1 wherein said pipes are pipe sections having a first end segment receivable in said adapter and a second end segment protruding outwardly from said further wall means, and a coupling having an inside surface, a first end segment and a second end segment is positioned about said second end segment of each said pipe section with said outside surface along said second end segment of each said pipe section being juxtaposed to said inside surface along said first end segment of a corresponding coupling, and a single bore pipe having an outside surface is inserted into each coupling with said outside surface of each said single bore pipe being juxtaposed to said inside surface along said second end segment of a corresponding coupling, each said coupling being bonded to the corresponding pipe section and single bore pipe.

6. An adapter as defined in claim 5 wherein said coupling is cylindrical and the inside transverse diameter along said first segment of said coupling is the same as the inside transverse diameter along said second end segment of said coupling, and the outside transverse diameter along said second end segment of each said pipe section is the same as the outside transverse diameter of each said single bore pipe.

7. An adapter as defined in claim 1 wherein said means for connecting said adapter to an end of a multiple duct section comprises partition walls on one end of said conduit and projecting outwardly thereof, and in which said partition walls in said adapter are correspondingly recessed at said one end thereof, whereby complementary partition walls on said conduit and said adapter may be interlockingly engaged to provide column-like support at the joint therebetween.

8. An adapter as defined in claim 1 wherein said conduit has a sidewall defining a passage therein and means defining a female portion at one end of said sidewall, and said adapter has an outwardly tapered male portion at said one end and integral therewith, said male portion being receivable in said female portion of said conduit, the outer transverse dimension of said male portion being generally equal to the inner transverse dimensions of said female portion of said conduit.

9. An adapter as defined in claim 8 wherein a plurality of spring clips engageable with said adapter and conduit section secure the adapter and conduit section together.

10. An adapter as defined in claim 8 wherein a bonding material is inserted between said adapter and conduit section and is melted to weld the adapter and conduit section together.

11. An adapter as defined in claim 7 wherein said recessed partition wall portions define generally U-shaped recesses having legs defining inclined bearing surfaces and said projecting partition walls are complementary to said recesses.

12. An adapter as defined in claim 11 wherein said legs are inclined at an angle of from about 10° to about 20° from a longitudinal plane normal to the respective partition walls.

13. An adapter as defined in claim 7 wherein said projecting partition wall portions project within said female portion.

* * * * *